United States Patent [19]
Yamato et al.

[11] Patent Number: 5,707,445
[45] Date of Patent: Jan. 13, 1998

[54] ADMIXTURE FOR CONCRETE

[75] Inventors: Fujio Yamato; Shuichi Fujita; Yoshiaki Tanisho; Kazushige Kitagawa; Haruyuki Satoh, all of Wakayama, Japan

[73] Assignee: Kao Corporation, Tokyo, Japan

[21] Appl. No.: 663,184

[22] PCT Filed: Dec. 14, 1994

[86] PCT No.: PCT/JP94/02097

§ 371 Date: Jun. 13, 1996

§ 102(e) Date: Jun. 13, 1996

[87] PCT Pub. No.: WO95/16643

PCT Pub. Date: Jun. 22, 1995

[30] Foreign Application Priority Data

Dec. 14, 1993 [JP] Japan .................................. 5-313203
May 16, 1994 [JP] Japan .................................. 6-101099

[51] Int. Cl.$^6$ ..................... C04B 24/04; C04B 24/16; C04B 24/26

[52] U.S. Cl. ................. 106/802; 106/725; 106/724; 106/727; 106/728; 106/808; 106/809; 106/810; 106/823; 524/2; 524/5; 524/650; 526/240; 526/286; 525/291; 525/293

[58] Field of Search ............... 106/802, 808, 106/809, 810, 823, 725, 728, 724, 727; 524/2, 5, 650; 526/240, 286; 525/291, 293

[56] References Cited

FOREIGN PATENT DOCUMENTS

| 0331308 | 2/1989 | European Pat. Off. . |
|---|---|---|
| 0560602 | 9/1993 | European Pat. Off. . |
| 59-918338 | 4/1984 | Japan . |
| 59-162163 | 9/1984 | Japan . |
| 62-70250 | 3/1987 | Japan . |
| 62-78137 | 4/1987 | Japan . |
| 6256054 | 9/1994 | Japan . |

*Primary Examiner*—Michael Marcheschi
*Attorney, Agent, or Firm*—Birch, Stewart, Kolasch & Birch, LLP

[57] ABSTRACT

An admixture for concrete comprising, as an essential component, a copolymer prepared by copolymerizing (a) a polyalkylene glycol monoester monomer having 110 to 300 mols of an oxyalkylene group(s) each having 2 to 3 carbon atoms, with (b) at least one monomer selected from among acrylic monomers, unsaturated dicarboxylic monomers and allylsulfonic monomers. When this admixture is used in preparing concrete, the resulting concrete composition undergoes little change in the slump for a lengthened time, so that the quality of the concrete composition can be easily controlled.

8 Claims, No Drawings

ADMIXTURE FOR CONCRETE

BACKGROUND OF THE INVENTION

The present application is filed under 35 U.S.C. §271 of PCT/JP94/02097, filed on Dec. 14, 1994.

FIELD OF THE INVENTION

The present invention relates to an admixture for concrete. In particular, the present invention relates to an admixture for concrete which can impart proper fluidity to a hydraulic composition such as cement paste, mortar and concrete, and has an excellent effect on the retention of fluidity of the composition.

DESCRIPTION OF THE RELATED ART

Among various admixtures for concrete, representative examples of the admixture having a high fluidizing effect on a hydraulic composition include so-called high range water reducing agents such as salts of condensates of naphthalenesulfonic acid with formaldehyde (hereinafter referred to as "the naphthalene compounds"), salts of condensates of melaminesulfonic acid with formaldehyde (hereinafter referred to as "the melamine compounds"), and salts of polycarboxylic acids (hereinafter referred to as "the polycarboxylic acid compounds").

These admixtures have respective disadvantages, though they also exhibit excellent functions. For example, when the naphthalene or melamine compound is added to a hydraulic composition, the resulting composition is problematic in the retention of fluidity (hereinafter referred to as "slump loss"), though the composition is excellent in hardening characteristics, while the polycarboxylic acid compound has the problem of significantly retarding the hardening of the composition.

There has recently been developed another polycarboxylic acid compound which can impart a proper fluidity to concrete. Since this polycarboxylic acid admixture can exhibit an excellent dispersing effect even when used in a small amount, the amount of the admixture to be added can be reduced, which makes it possible to solve the above problem of retarding the hardening. Examples of the polycarboxylic acid compound include water-soluble vinyl copolymers such as copolymers comprising a polyalkylene glycol monoester monomer having an unsaturated bond and one or more members selected from among acrylic monomers and unsaturated dicarboxylic monomers (see Japanese Patent Publication-B No. 59-18338, published on Apr. 26, 1984).

It is presumed that the water-soluble vinyl copolymer having an oxyalkylene chain exhibits its dispersing effect by the mechanism such that the oxyalkylene chain, which constitutes a graft structure, of the copolymer sterically hinders the adhesion among particles.

However, the above problem of slump loss cannot be solved even when the above polycarboxylic acid having an oxyalkylene chain is used, so that great pains are still taken in controlling the quality of concrete over the whole period from the preparation thereof until the placement thereof through transportation.

The polyalkylene glycol monoester monomer having an unsaturated bond, which is disclosed in the above Japanese Patent Publication-B, has 1 to 100 of an oxyalkylene group (s) each having 2 to 4 carbon atoms. However, the above monomers specifically disclosed in the Referential Example of the above patent document are those prepared by adding ethylene oxide to the starting material thereof, wherein the number of ethylene oxide molecules added is at most 23. Further, the patent document is silent about a monomer prepared by adding more than 23 alkylene oxide molecules to the starting material thereof.

DISCLOSURE OF THE INVENTION

Summary of the Invention

The present inventors have made extensive studies on water-soluble vinyl copolymers having an oxyalkylene chain, and in particular, the relationship between the length of the oxyalkylene chain of a starting monomer and the performance of the copolymer prepared by the use of the monomer. As a result of the studies, they have found that when a copolymer prepared by the use of a monomer having a long oxyalkylene chain with its length being in a specific range (corresponding to a number of alkylene oxide molecules added of 110 to 300) is used as an admixture for concrete, the above problem with respect to slump loss is dramatically solved, while the dispersing effect inherent in a polycarboxylic admixture is not adversely affected. The present invention has been accomplished on the basis of this finding.

Thus, the present invention relates to an admixture for concrete comprising a copolymer prepared by copolymerizing a monomer (a) represented by the following formula (A) with a monomer (b) selected from the group consisting of the compounds represented by the following formula (B) and those represented by the following formula (C):

wherein $R_1$ and $R_2$ may be the same or different from each other and each represents a hydrogen atom or a methyl group; m1 is an integer of 0 to 2; AO represents an oxyalkylene group having 2 to 3 carbon atoms; n is a number of 110 to 300; and X represents a hydrogen atom or an alkyl group having 1 to 3 carbon atoms,

wherein $R_3$, $R_4$ and $R_5$ may be the same or different from one another and each represents a hydrogen atom, a methyl group or a group represented by the formula: $(CH_2)_{m2}COOM_2$ (wherein m2 is an integer of 0 to 2; and $M_2$ represents a hydrogen atom, an alkali metal atom, ½ an alkaline earth metal atom, an ammonium group, an alkylammonium group or a substituted alkylammonium group); and $M_1$ represents a hydrogen atom, an alkali metal atom, ½ an alkaline earth metal atom, an ammonium group, an alkylammonium group or a substituted alkylammonium group, and

wherein $R_6$ represents a hydrogen atom or a methyl group; and Y represents a hydrogen atom, an alkali metal atom, ½ an alkaline earth metal atom, an ammonium group, an alkylammonium group or a substituted alkylammonium group.

In the formula (A), n refers to not only the number of alkylene oxide molecules added of one compound represented by the formula (A), but also the average number of alkylene oxide molecules added of a mixture of compounds represented by the formula (A) which are different from one another only in the number of alkylene oxide molecules added. In the former case, n is an integer of 110 to 300, while in the latter, n is a number of 110 to 300, preferably an integer of 110 to 300. In the latter, the above-mentioned mixture has a distribution with respect to the number of alkylene oxide molecules added. The mixture having an average number of alkylene oxide molecules added of 110 to 300 may contain also a compound having a number of alkylene oxide molecules added of less than 110 and/or a compound having a number of alkylene oxide molecules added of more than 300.

The present invention includes an admixture for concrete comprising, as an essential component, a copolymer prepared by copolymerizing a monomer (a) represented by the following general formula (A-1) with at least one monomer (b) selected from among the compounds represented by the following general formula (B-1) and those represented by the following general formula (C-1):

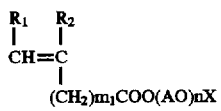  general formula (A-1)

(wherein, $R_1$ and $R_2$: hydrogen or a methyl group, $m_1$: an integer of 0 to 2, AO: an oxyalkylene group having 2 to 3 carbon atoms, n: an integer of 110 to 300, X: hydrogen or an alkyl group having 1 to 3 carbon atoms),

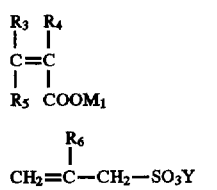  general formula (B-1)

general information (C-1)

(wherein, $R_3$–$R_5$: hydrogen, a methyl group or $(CH_2)_{m2}COOM_2$, $R_6$: hydrogen or a methyl group, $M_1$, $M_2$ and Y: hydrogen, alkali metal, alkaline earth metal, ammonium, alkylammonium or substituted alkylammonium, $m_2$: an integer of 0 to 2).

The present invention also includes an admixture for concrete comprising, as an essential component, a copolymer prepared by copolymerizing a monomer (a) represented by the following general formula (A-2) with at least one monomer (b) selected from among the compounds represented by the following general formula (B-2) and those represented by the following general formula (C-2):

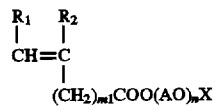  general formula (A-2)

(wherein, $R_1$ and $R_2$: hydrogen or a methyl group, $m_1$: an integer of 0 to 2, AO: an oxyalkylene group having 2 to 3 carbon atoms, n: an integer of 110 to 300, X: hydrogen or an alkyl group having 1 to 3 carbon atoms),

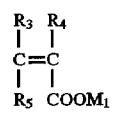  general formula (B-2)

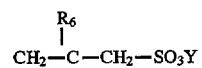  general information (C-2)

(wherein, $R_3$ and $R_6$: hydrogen or a methyl group, $R_4$ and $R_5$: hydrogen, a methyl group or $(CH_2)_{m2}COOM_2$, $M_1$ and $M_2$: hydrogen, alkali metal, alkaline earth metal, an ammonium group, an amino group or a substituted amino group, $m_2$: an integer of 0 to 2, Y: hydrogen, alkali metal, alkaline earth metal, an ammonium group, an amino group or a substituted amino group).

Further, the present invention relates to a method for improving the fluidity of a hydraulic composition which comprises adding a copolymer prepared by copolymerizing a monomer (a) represented by the above formula (A) with a monomer (b) selected from the group consisting of the compounds represented by the above formula (B) and those represented by the above formula (C) to a hydraulic composition, and use of a copolymer prepared by copolymerizing a monomer (a) represented by the above formula (A) with a monomer (b) selected from the group consisting of the compounds represented by the above formula (B) and those represented by the above formula (C) for improving the fluidity of a hydraulic composition.

The term "hydraulic composition" refers to cement paste (or a cement composition), mortar (before hardening), concrete (before hardening) or the like. When the hydraulic composition is mortar or concrete, it further contains an aggregate, generally.

Furthermore, the present invention relates to a hydraulic composition comprising a copolymer prepared by copolymerizing a monomer (a) represented by the above formula (A) with a monomer (b) selected from the group consisting of the compounds represented by the above formula (B) and those represented by the above formula (C), cement and water.

To describe the present invention from the standpoint of the mechanism of dispersion, the mechanism is presumably as follows: since the water-soluble vinyl copolymer according to the present invention has a lengthened oxyalkylene chain, it takes a lengthened time until the copolymer takes part in the hydration of cement, so that the resulting hydraulic composition can maintain its high slump value, while the dispersing effect of the copolymer is not lowered.

DETAILED DESCRIPTION OF THE INVENTION

Examples of the monomer (a) represented by the formula (A) to be used in the present invention includes esters of polyalkylene glycols having one end etherified with alkyl [for example, methoxypolyethylene glycol, i.e., adduct of methanol with ethylene oxide (n is from 110 to 300), methoxypolyethylenepolypropylene glycol, ethoxypolyethylene glycol, ethoxypolyethylenepolypropylene glycol, propoxypolyethylene glycol and propoxypolyethylenepolypropylene glycol] with acrylic acid, methacrylic acid and products of dehydrogenation (or oxidation) of fatty acids; and adducts of acrylic acid, methacrylic acid and products of dehydrogenation (or oxidation) of fatty acids with ethylene oxide and/or propylene oxide.

The number of the oxyalkylene groups constituting the oxyalkylene chain of the above polyalkylene glycol, or the (average) number of alkylene oxide molecules added of the above adduct is from 110 to 300. When both ethylene oxide and propylene oxide are added, they may be added in any manner of a random addition, a block addition, an alternating addition and others. When the number of the oxyalkylene groups constituting the oxyalkylene chain of the polyalkylene glycol or the (average) number of alkylene oxide molecules added of the adduct is less than 110, the resulting copolymer will exhibit a poor slump-retaining effect, while when it exceeds 300, not only the polymerizability in the preparation of the copolymer will be low but the resulting copolymer will exhibit a poor dispersing effect.

The compound represented by the formula (B) includes unsaturated monocarboxylic acid monomers and unsaturated polycarboxylic acid monomers. Examples of the unsaturated monocarboxylic acid monomers include acrylic acid, methacrylic acid and crotonic acid, and their alkali metal salts, alkaline earth metal salts, ammonium salts, alkylamine salts and substituted alkylamine salts. Among them, acrylic acid, methacrylic acid and crotonic acid, and alkali metal salts thereof are preferable. While, examples of the unsaturated dicarboxylic acid monomers include maleic anhydride, maleic acid, itaconic anhydride, itaconic acid, citraconic anhydride, citraconic acid and fumaric acid, and their alkali metal salts, alkaline earth metal salts, ammonium salts, alkylamine salts and substituted alkylamine salts. The alkyl group of the alkylamine salt is preferably one having 1 to 3 carbon atoms. Examples of the substituted alkylamine include monoethanolamine, diethanolamine and triethanolamine.

Examples of the compound represented by the formula (C) include allylsulfonic acid and methallyl-sulfonic acid, and their alkali metal salts, alkaline earth metal salts, ammonium salts, alkylamine salts and substituted alkylamine salts. The number of carbon atoms of the alkyl group of the alkylamine salt and examples of the substituted alkyl group of the substituted alkylamine are the same as those described above with respect to the compound represented by the formula (B).

In the present invention, it is suitable that the starting monomers (a) and (b) are each used in such an amount that a molar ratio of the monomer (a) to the monomer (b), i.e., monomer (a)/monomer (b), ranges from 0.1/100 to 100/100. When the molar ratio ranges from 0.1/100 to 10/100, particularly when it is 0.1/100 or above but less than 10/100, the resulting copolymer exhibits an excellent slump retaining effect. When the molar ratio ranges from 10/100 to 100/100, the resulting copolymer exhibits an extremely excellent slump retaining effect, with the fluidizing effect on hydraulic compositions being retained. When the molar ratio is less than 0.1/100, the resulting copolymer will exhibits a poor slump-retaining effect, while when it exceeds 100/100, the copolymerizability will be unfavorably poor.

The copolymer according to the present invention can be prepared by known processes. Examples thereof include solvent polymerization disclosed in Japanese Patent Publication-A Nos. 59-162163 (published on Sep. 13, 1984), 62-70250 (published on Mar. 31, 1987) and 62-78137 (published on Apr. 10, 1987), U.S. Pat. No. 4,870,120 (date of patent: Sep. 26, 1989, assignee: Nippon Shokubai Kagaku Kogyo Co., Ltd.) and U.S. Pat. No. 5,137,945 (date of patent: Aug. 11, 1992, assignee: Nippon Shokubai Kagaku Kogyo Co. Ltd.) and others.

Examples of the solvent to be used in the above solvent polymerization include water, methanol, ethanol, isopropanol, benzene, toluene, xylene, aliphatic hydrocarbons such as cyclohexane and n-hexane, ethyl acetate, acetone and methyl ethyl ketone. Water and mono- to tetra-hydric alcohols are preferable from the standpoint of workability and reaction equipment.

In the solvent polymerization using an aqueous solvent, a water-soluble polymerization initiator such as ammonium salts and alkali metal salts of persulfuric acids (i.e., peroxysulfuric acid and peroxydisulfuric acid), and hydrogen peroxide is used as the polymerization initiator. In the solvent polymerization using a solvent other than the aqueous ones, benzoyl peroxide, lauroyl peroxide or the like is used as the polymerization initiator.

Further, a polymerization accelerator such as sodium hydrogensulfite, mercaptoethanol and an amine compound may be used together with the polymerization initiator. According to the present invention, the polymerization initiator and polymerization accelerator to be used are suitably selected.

It is preferable that the copolymer of the present invention have a weight-average molecular weight of 3,000 to 1,000,000, still more preferably 5,000 to 100,000. When the molecular weight is too large, the resulting copolymer will exhibit a poor dispersing effect, while when it is too small, the resulting copolymer will exhibit a poor slump-retaining effect. The weight-average molecular weight is determined by gel permeation chromatography using sodium polystyrenesulfonate as a standard reference material.

In the preparation of the copolymer according to the present invention, in addition of the monomers (a) and (b), other monomer(s), which is copolymerizable with the monomers (a) and (b), may be used so far as the effects of the present invention are not impaired. Examples of such a monomer include acrylonitrile, acrylic acid ester, acrylamide, methacrylamide, styrene and styrenesulfonic acid.

The amount of the admixture for concrete of the present invention to be added is preferably 0.02 to 1.0% by weight, still more preferably 0.05 to 0.5% by weight in terms of solid matter, i.e., as the amount of the comonomer of the present invention, based on the weight of the cement.

The admixture for concrete according to the present invention may be used together with known additives and/or known auxiliary materials. Examples of such additives include air entraining (AE) agents, AE water reducing agents, fluidizing agents, high range water reducing agents, retardants, high-early-strength agents, accelerators, foaming agents, blowing agents, defoaming agents, thickening agents, waterproofing agents and antifoaming agents, while those of such auxiliary materials include quartz sand, blast furnace slag, fly ash and pyrogenic silica.

The admixture for concrete according to the present invention is added to cement pastes comprising known hydraulic cements, known mortar, known concrete and so forth. The formulation of the cement paste, mortar or concrete is not limited.

The hydraulic composition of the present invention is a mixture of the admixture for concrete of the present invention with a known cement paste, mortar, concrete or the like. In other words, when the hydraulic composition of the present invention is a cement paste, the composition comprises the copolymer according to the present invention, cement and water, while when the composition is mortar or concrete, it comprises the copolymer according to the present invention, cement, an aggregate and water. The hydraulic composition of the present invention contains the copolymer according to the present invention preferably in an amount of 0.02 to 1.0% by weight, still more preferably 0.05 to 0.5% by weight based on the weight of the cement.

EXAMPLES

The present invention will now be described in more detail by referring to the following Examples, though the scope of the present invention is not limited by them.

In the following Examples, all percentages are given by weight.

The molecular weights of the condensates and copolymers described in the Examples are each a weight-average molecular weight which is determined by gel permeation chromatography using sodium polystyrenesulfonate as a standard reference material.

The monomers (a) used in the preparation of copolymers according to the present invention will now be described, wherein EO represents ethylene oxide and PO propylene oxide.

A-1: monomethacrylate of adduct of methanol with EO (average number of EO molecules added: 115)
A-2: monoacrylate of adduct of methanol with EO (average number of EO molecules added: 220)
A-3: monomethacrylate of adduct of methanol with EO (average number of EO molecules added: 280)
A-4: adduct of acrylic acid with EO (average number of EO molecules added: 130)
A-5: block adduct of acrylic acid with PO and EO (average number of PO molecules added: 10, average number of EO molecules added: 135)
A-6: block adduct of acrylic acid with EO and PO (average number of Eo molecules added: 135, average number of PO molecules added: 5)
A-7: monomethacrylate of adduct of methanol with EO (average number of EO molecules added: 23) (Comparative Example)
A-8: monomethacrylate of adduct of methanol with EO (average number of EO molecules added: 100) (Comparative Example)
A-9: monomethacrylate of adduct of methanol with EO (average number of EO molecules added: 350) (Comparative Example)

Preparative Examples of the copolymers will now be described.

Preparative Example 1 (Preparation of Admixture 1 for Concrete)

10 mol of water was fed into a reactor fitted with a stirrer. Oxygen in the reactor was purged with nitrogen while stirring the water. The temperature of the water was raised to 75° C. in a nitrogen atmosphere. A solution prepared by dissolving 0.09 mol of monomer A-1 and 1 mol of acrylic acid (molar ratio: 9/100) in 7.5 mol of water, a 20% aqueous solution prepared by dissolving 0.01 mol of ammonium persulfate in water, and 4 g of 2-mercaptoethanol were dropwise added to the water in the reactor simultaneously and separately in 2 hours. Then, a 20% aqueous solution prepared by dissolving 0.03 mol of ammonium persulfate in water was dropwise added to the reaction system in 30 minutes. After the completion of the dropwise addition, the reaction system was maintained at that temperature (75° C.) for one hour. That is, aging was effected. After the completion of the aging, the temperature of the reaction system was raised to 95° C. Then, 12 g of a 35% aqueous hydrogen peroxide was dropwise added to the reaction system in one hour. After the completion of the dropwise addition, the temperature of the reaction system was maintained at that temperature (95° C.) for 2 hours. That is, aging was effected. After the completion of the aging, a 48% aqueous solution prepared by dissolving 0.7 mol of sodium hydroxide in water was added to the obtained reaction mixture to conduct neutralization. Thus, a copolymer having a molecular weight of 22,000, i.e., admixture 1 for concrete, was obtained.

Preparative Example 2 (Preparation of Admixture 2 for Concrete)

8 mol of water was fed into a reactor fitted with a stirrer. Oxygen in the reactor was purged with nitrogen while stirring the water. The temperature of the water was raised to 75° C. in a nitrogen atmosphere. A solution prepared by dissolving 0.05 mol of monomer A-2 and 1 mol of methacrylic acid (molar ratio: 5/100) in 8.5 mol of water, a 20% aqueous solution prepared by dissolving 0.01 mol of ammonium persulfate in water, and 3 g of 2-mercaptoethanol were dropwise added to the water in the reactor simultaneously and separately in 2 hours. Then, a 20% aqueous solution prepared by dissolving 0.03 mol of ammonium persulfate in water was dropwise added to the reaction system in 30 minutes. After the completion of the dropwise addition, the reaction system was maintained at that temperature (75° C.) for one hour. That is, aging was effected. After the completion of the aging, the temperature of the reaction system was raised to 95° C. Then. 9 g of a 35% aqueous hydrogen peroxide was dropwise added to the reaction system in one hour. After the completion of the dropwise addition, the reaction system was maintained at that temperature (95° C.) for 2 hours. That is, aging was effected. After the completion of the aging, a 48% aqueous solution prepared by dissolving 0.7 mol of sodium hydroxide in water was added to the obtained reaction mixture to conduct neutralization. Thus, a copolymer having a molecular weight of 85,000, i.e., admixture 2 for concrete, was obtained.

Preparative Example 3 (Preparation of Admixture 3 for Concrete)

5 mol of water was fed into a reactor fitted with a stirrer. Oxygen in the reactor was purged with nitrogen while stirring the water. The temperature of the water was raised to 95° C. in a nitrogen atmosphere. A solution prepared by dissolving 0.002 mol of monomer A-3 and 1 mol of monosodium maleate (molar ratio: 0.2/100) in 15 mol of hot water at 90° C., a 20% aqueous solution prepared by dissolving 0.01 mol of ammonium persulfate in water, and 3 g of 2-mercaptoethanol were dropwise added to the water in the reactor simultaneously and separately in 2 hours. Then, a 20% aqueous solution prepared by dissolving 0.03 mol of ammonium persulfate in water was dropwise added to the reaction system in 30 minutes. After the completion of the dropwise addition, the reaction system was maintained at that temperature (95° C.) for one hour. That is, aging was effected. After the completion of the aging, 9 g of a 35% aqueous hydrogen peroxide was dropwise added to the reaction system at that temperature (95° C.) in one hour. After the completion of the dropwise addition, the reaction system was maintained at that temperature (95° C.) for 2 hours. That is, aging was effected. After the completion of the aging, a 48% aqueous solution prepared by dissolving 0.7 mol of sodium hydroxide in water was added to the obtained reaction mixture to conduct neutralization. Thus, a copolymer having a molecular weight of 12,000, i.e., admixture 3 for concrete, was obtained.

Preparative Example 4 (Preparation of Admixture 4 for Concrete)

10 mol of water was fed into a reactor fitted with a stirrer. Oxygen in the reactor was purged with nitrogen while stirring the water. The temperature of the water was raised to 75° C. in a nitrogen atmosphere. A solution prepared by dissolving 0.01 mol of monomer A-4, 0.9 mol of acrylic acid and 0.1 mol of sodium methallylsulfonate (molar ratio: 1/90/10) in 7.5 mol of water, a 20% aqueous solution prepared by dissolving 0.01 mol of ammonium persulfate in water, and 4 g of 2-mercaptoethanol were dropwise added to the water in the reactor simultaneously and separately in 2 hours. Then, a 20% aqueous solution prepared by dissolving 0.03 mol of ammonium persulfate in water was dropwise added to the reaction system in 30 minutes. After the completion of the dropwise addition, the reaction system was maintained at that temperature (75° C.) for one hour. That is, aging was effected. After the completion of the aging, the temperature of the reaction system was raised to 95° C. Then, 12 g of a 35% aqueous hydrogen peroxide was dropwise added to the reaction system in one hour. After the completion of the dropwise addition, the reaction system was maintained at that temperature (95° C.) for 2 hours. That is, aging was effected. After the completion of the aging, a 48% aqueous solution prepared by dissolving 0.6 mol of sodium hydroxide in water was added to the obtained reaction mixture to conduct neutralization. Thus, a copolymer having a molecular weight of 7,200, i.e., admixture 4 for concrete, was obtained.

Preparative Example 5 (Preparation of Admixture 5 for Concrete)

10 mol of water was fed into a reactor fitted with a stirrer. Oxygen in the reactor was purged with nitrogen while stirring the water. The temperature of the water was raised to 75° C. in a nitrogen atmosphere. A solution prepared by dissolving 0.01 mol of monomer A-5 and 1 mol of methacrylic acid (molar ratio: 1/100) in 7.5 mol of water, a 20% aqueous solution of 0.01 mol of ammonium persulfate in water, and 1 g of 2-mercaptoethanol were dropwise added to the water in the reactor simultaneously and separately in 2 hours. Then, a 20% aqueous solution prepared by dissolving 0.08 mol of ammonium persulfate in water was dropwise added to the reaction system in 80 minutes. After the completion of the dropwise addition, the reaction system was maintained at that temperature (75° C.) for one hour. That is, aging was effected. After the completion of the aging, the temperature of the reaction system was raised to 95° C. Then, 5 g of a 35% aqueous hydrogen peroxide was dropwise added to the reaction system in one hour. After the completion of the dropwise addition, the reaction system was maintained at that temperature (95° C.) for 2 hours. That is, aging was effected. After the completion of the aging, a 48% aqueous solution prepared by dissolving 0.7 mol of sodium hydroxide in water was added to the obtained reaction mixture to conduct neutralization. Thus, a copolymer having a molecular weight of 105,000, i.e., admixture 5 for concrete, was obtained.

Preparative Example 6 (Preparation of Admixture 6 for Concrete)

10 mol of water was fed into a reactor fitted with a stirrer. Oxygen in the reactor was purged with nitrogen while stirring the water. The temperature of the water was raised to 75° C. in a nitrogen atmosphere. A solution prepared by dissolving 0.01 mol of monomer A-6 and 1 mol of sodium acrylate (molar ratio: 1/100) in 7.5 mol of water, a 20% aqueous solution prepared by dissolving 0.01 mol of ammonium persulfate in water, and 2 g of 2-mercaptoethanol were dropwise added to the water in the reactor simultaneously and separately in 2 hours. Then, a 20% aqueous solution prepared by dissolving 0.03 mol of ammonium persulfate in water was dropwise added to the reaction system in 30 minutes. After the completion of the dropwise addition, the reaction system was maintained at that temperature (75° C.) for one hour. That is, aging was effected. After the completion of the aging, the temperature of the reaction system was raised to 95° C. Then, 9 g of a 35% aqueous hydrogen peroxide was dropwise added to the reaction system in one hour. After the completion of the dropwise addition, the reaction system was maintained at that temperature (95° C.) for 2 hours. That is, aging was effected. After the completion of the aging, a 48% aqueous solution prepared by dissolving 0.7 mol of sodium hydroxide in water was added to the obtained reaction mixture to conduct neutralization. Thus, a copolymer having a molecular weight of 77,000, i.e., admixture 6 for concrete, was obtained.

Preparative Example 7 (Preparation of Admixture 7 for Concrete)

27 mol of water was fed into a reactor fitted with a stirrer. Oxygen in the reactor was purged with nitrogen while stirring the water. The temperature of the water was raised to 75° C. in a nitrogen atmosphere. A solution prepared by dissolving 0.045 mol of monomer A-2 and 0.3 g mol of acrylic acid (molar ratio: 15/100) in 10 mol of water, a 20% aqueous solution prepared by dissolving 0.003 mol of ammonium persulfate in water, and 1.2 g of 2-mercaptoethanol were dropwise added to the water in the reactor simultaneously and separately in 2 hours. Then, a 20% aqueous solution prepared by dissolving 0.009 mol of ammonium persulfate in water was dropwise added to the reaction system in 30 minutes. After the completion of the dropwise addition, the reaction system was maintained at that temperature (75° C.) for one hour. That is, aging was effected. After the completion of the aging, the temperature of the reaction system was raised to 95° C. Then, 4 g of a 35% aqueous hydrogen peroxide was dropwise added to the reaction system in one hour. After the completion of the dropwise addition, the reaction system was maintained at that temperature (95° C.) for 2 hours. That is, aging was effected. After the completion of the aging, a 48% aqueous solution prepared by dissolving 0.21 mol of sodium hydroxide in water was added to the obtained reaction mixture to conduct neutralization. Thus, a copolymer having a molecular weight of 51,000, i.e., admixture 7 for concrete, was obtained.

Preparative Example 8 (Preparation of Admixture 8 for Concrete)

23 mol of water was fed into a reactor fitted with a stirrer. Oxygen in the reactor was purged with nitrogen while stirring the water. The temperature of the water was raised to 75° C. in a nitrogen atmosphere. A solution prepared by dissolving 0.08 mol of monomer A-1 and 0.2 mol of acrylic acid (molar ratio: 40/100) in 12 mol of water, a 20% aqueous solution prepared by dissolving 0.002 mol of ammonium persulfate in water, and 0.6 g of 2-mercaptoethanol were dropwise added to the water in the reactor simultaneously and separately in 2 hours. Then, a 20% aqueous solution prepared by dissolving 0.006 mol of ammonium persulfate in water was dropwise added to the reaction system in 30 minutes. After the completion of the dropwise addition, the reaction system was maintained at that temperature (75° C.) for one hour. That is, aging was effected. After the completion of the aging, the temperature of the reaction system was raised to 95° C. Then, 3 g of a 35% aqueous hydrogen peroxide was dropwise added to the reaction system in one hour. After the completion of the dropwise addition, the reaction system was maintained at that temperature (95° C.) for 2 hours. That is, aging was effected. After the completion of the aging, a 48% aqueous solution prepared by dissolving 0.14 mol of sodium hydroxide in water was added to the obtained reaction mixture to conduct neutralization. Thus, a copolymer having a molecular weight of 56,000, i.e., admixture 8 for concrete, was obtained.

Preparative Example 9 (Preparation of Admixture 9 for Concrete)

18 mol of water was fed into a reactor fitted with a stirrer. Oxygen in the reactor was purged with nitrogen while stirring the water. The temperature of the water was raised to 75° C. in a nitrogen atmosphere. A solution prepared by dissolving 0.06 mol of monomer A-1 and 0.1 mol of acrylic acid (molar ratio: 60/100) in 8 mol of water, a 20% aqueous solution prepared by dissolving 0.001 mol of ammonium persulfate in water, and 0.3 g of 2-mercaptoethanol were dropwise added to the water in the reactor simultaneously and separately in 2 hours. Then, a 20% aqueous solution prepared by dissolving 0.003 mol of ammonium persulfate in water was dropwise added to the reaction system in 30 minutes. After the completion of the dropwise addition, the reaction system was maintained at that temperature (75° C.) for one hour. That is, aging was effected. After the completion of the aging, the temperature of the reaction system was raised to 95° C. Then, 2 g of a 35% aqueous hydrogen peroxide was dropwise added to the reaction system in one hour. After the completion of the dropwise addition, the reaction system was maintained at that temperature (95° C.) for 2 hours. That is, aging was effected. After the completion of the aging, a 48% aqueous solution prepared by dissolving 0.07 mol of sodium hydroxide in water was added to the obtained reaction mixture to conduct neutralization. Thus, a copolymer having a molecular weight of 45,000, i.e., admixture 9 for concrete, was obtained.

Preparative Example 10 (Preparation of Admixture 10 for Concrete)

30 mol of water was fed into a reactor fitted with a stirrer. Oxygen in the reactor was purged with nitrogen while stirring the water. The temperature of the water was raised to 75° C. in a nitrogen atmosphere. A solution prepared by dissolving 0.1 mol of monomer A-1 and 0.1 mol of acrylic acid (molar ratio: 100/100) in 13 mol of water, a 20% aqueous solution prepared by dissolving 0.001 mol of ammonium persulfate in water, and 0.3 g of 2-mercaptoethanol were dropwise added to the water in the reactor simultaneously and separately in 2 hours. Then, a 20% solution prepared by dissolving 0.003 mol of ammonium persulfate in water was dropwise added to the reaction system in 30 minutes. After the completion of the dropwise addition, the reaction system was maintained at that temperature (75° C.) for one hour. That is, aging was effected. After the completion of the aging, the temperature of the reaction system was raised to 95° C. Then, 2 g of a 35% aqueous hydrogen peroxide was dropwise added to the reaction system in one hour. After the completion of the dropwise addition, the reaction system was maintained at that temperature (95° C.) for 2 hours. That is, aging was effected. After the completion of the aging, a 48% aqueous solution prepared by dissolving 0.07 mol of sodium hydroxide in water was added to the obtained reaction mixture to conduct neutralization. Thus, a copolymer having a molecular weight of 72,000, i.e., admixture 10 for concrete, was obtained.

Preparative Example 11 (Preparation of Admixture 11 for Concrete)

10 mol of water was fed into a reactor fitted with a stirrer. Oxygen in the reactor was purged with nitrogen while stirring the water. The temperature of the water was raised to 75° C. in a nitrogen atmosphere. A solution prepared by dissolving 0.1 mol of monomer A-7 and 1 mol of acrylic acid (molar ratio: 10/100) in 7.5 mol of water, a 20% aqueous solution prepared by dissolving 0.01 mol of ammonium persulfate in water, and 4 g of 2-mercaptoethanol were dropwise added to the water in the reactor simultaneously and separately in 2 hours. Then, a 20% aqueous solution prepared by dissolving 0.03 mol of ammonium persulfate in water was dropwise added to the reaction system in 30 minutes. After the completion of the dropwise addition, the reaction system was maintained at that temperature (75° C.) for one hour. That is, aging was effected. After the completion of the aging, the temperature of the reaction system was raised to 95° C. Then, 12 g of a 35% aqueous hydrogen peroxide was dropwise added to the reaction system in one hour. After the completion of the dropwose addition, the reaction system was maintained at that temperature (95° C.) for 2 hours. That is, aging was effected. After the completion of the aging, a 48% aqueous solution prepared by dissolving 0.7 mol of sodium hydroxide in water was added to the obtained reaction mixture to conduct neutralization. Thus, a copolymer having a molecular weight of 11,000, i.e., admixture 11 for concrete, was obtained.

Preparative Example 12 (Preparation of Admixture 12 for Concrete)

10 mol of water was fed into a reactor fitted with a stirrer. Oxygen in the reactor was purged with nitrogen while stirring the water. The temperature of the water was raised to 75° C. in a nitrogen atmosphere. A solution prepared by dissolving 0.05 mol of monomer A-8 and 1 mol of acrylic acid (molar ratio: 5/100) in 7.5 mol of water, a 20% aqueous solution prepared by dissolving 0.01 mol of ammonium persulfate in water, and 3 g of 2-mercaptoethanol were dropwise added to the water in the reactor simultaneously and separately in 2 hours. Then, a 20% aqueous solution prepared by dissolving 0.03 mol of ammonium persulfate in water was dropwise added to the reaction system in 30 minutes. After the completion of the dropwise addition, the reaction system was maintained at that temperature (75° C.) for one hour. That is, aging was effected. After the completion of the aging, the temperature of the reaction system was raised to 95° C. Then, 10 g of a 35% aqueous hydrogen peroxide was dropwise added to the reaction system in one hour. After the completion of the dropwise addition, the reaction system was maintained at that temperature (95° C.)

for 2 hours. That is, aging was effected. After the completion of the aging, a 48% aqueous solution prepared by dissolving 0.7 mol of sodium hydroxide in water was added to the obtained reaction mixture to conduct neutralization. Thus, a copolymer having a molecular weight of 31,000, i.e., admixture 12 for concrete, was obtained.

Preparative Example 13 (Preparation of Admixture 13 for Concrete)

5 mol of water was fed into a reactor fitted with a stirrer. Oxygen in the reactor was purged with nitrogen while stirring the water. The temperature of the water was raised to 95° C. in a nitrogen atmosphere. A solution prepared by dissolving 0.005 mol of monomer A-9 and 1 mol of acrylic acid (molar ratio: 0.5/100) in 1.5 mol of warm water at 75° C., a 20% aqueous solution prepared by dissolving 0.01 mol of ammonium persulfate in water, and 3 g of 2-mercaptoethanol were drop wise added to the water in the reactor simultaneously and separately in 2 hours. Then, a 20% aqueous solution prepared by dissolving 0.03 mol of ammonium persulfate in water was dropwise added to the reaction system in 30 minutes. After the completion of the dropwise addition, the reaction system was maintained at that temperature (95° C.) for one hour. That is, aging was effected. After the completion of the aging, 9 g of a 35% aqueous hydrogen peroxide was dropwise added to the reaction system in one hour. After the completion of the dropwise addition, the reaction system was maintained at that temperature (95° C.) for 2 hours. That is, aging was effected. After the completion of the aging, a 48% aqueous solution prepared by dissolving 0.7 mol of sodium hydroxide in water was added to the obtained reaction mixture to conduct neutralization. Thus, a copolymer having a molecular weight of 25,000, i.e., admixture 13 for concrete, was obtained.

The following admixtures were also used as comparative ones in addition to the comparative copolymers prepared in the Preparative Examples 11 to 13:

NS: an admixture comprising salt of naphthalenesulfonic acid-formaldehyde condensate (Mighty 150, a product of Kao Corporation), and MS: an admixture comprising salt of melaminesulfonic acid-formaldehyde condensate (Mighty 150V-2, a product of Kao Corporation).

Evaluation of Admixtures for Concrete

Materials for concrete were prepared according to the conditions specified in Table 1. The materials were mixed with an admixture described above in a tilting mixer at 25 rpm for 3 minutes to prepare a concrete composition. In order to evaluate the fluidity of the concrete composition, the slump value thereof was determined according to the method stipulated in JIS A 1101. The slump value thus determined was taken as the initial one. Then, the mixer was rotated at 4 rpm for 60 minutes and, after the stopping of the rotation, the concrete composition was examined for slump value in the same manner as that described above. Thus, the slump value after 60 minutes was determined. Further, after the 90-minute rotation of the mixer under the same condition as that used above, the concrete composition was also examined for slump value. Thus, the slump value after 90 minutes was determined.

Each admixture was added in such an amount as to give an initial slump value of 20±1 cm.

The results are given in Table 2.

As is clarified from the results given in the Table 2, the admixture of the present invention can impart fluidity to a concrete composition even when used in a reduced amount as compared with that of the comparative admixture. Further, the concrete composition containing the admixture of the present invention is reduced in the lowering of the slump value with the lapse of time.

As described above, when the admixture for concrete according to the present invention is added to a hydraulic composition such as a cement composition, the resulting composition undergoes little change in the slump for a long time, so that the quality of the hydraulic composition can be easily controlled.

Generally, it takes about 90 minutes to transport ready mixed concrete from the preparation site thereof to the placement site. Therefore, ready mixed concrete must be controlled to maintain a slump value of about 15 or above over the period. The use of the admixture for concrete according to the present invention makes it possible to keep the slump value of ready mixed concrete at about 15 or above over a period of 90 minutes after the mixing.

The fact that the slump value of the ready mixed concrete containing the comparative admixture for concrete lowered to about 10 after 60 to 90 minutes from the completion of the mixing of the materials means that such a concrete will have been hardened before being placed. Such a concrete cannot be placed.

TABLE 1

| Formulation of concrete and materials used | | | | | |
|---|---|---|---|---|---|
| W/C | s/a | | Unit amt. (kg/m³) | | |
| (%) | (%) | C | W | S | G |
| 37.0 | 34.0 | 418 | 155 | 620 | 1220 |
| Material used | | | | | |

W: tap water
C: Chuo normal Portland cement (a product of Onoda Cement Co., Ltd.), specific gravity: 3.16
S: river sand from the Kino river, specific gravity: 2.60
G: crushed stone from Takarazuka, specific gravity: 2.63
s/a: sand/sand + gravel (S/S + G) (volume ratio)

TABLE 2

| | Type of admixture for concrete | Amt. of admixture for concrete added*¹ (%) | Slump value (cm) | | |
|---|---|---|---|---|---|
| | | | initial | after 60 min | after 90 min |
| Invention product | 1 | 0.16 | 20.5 | 19.3 | 16.5 |
| | 2 | 0.17 | 20.2 | 18.8 | 17.2 |
| | 3 | 0.20 | 20.7 | 18.9 | 15.9 |
| | 4 | 0.16 | 20.6 | 19.1 | 18.8 |
| | 5 | 0.17 | 20.3 | 19.3 | 18.3 |
| | 6 | 0.18 | 20.5 | 19.5 | 18.0 |
| | 7 | 0.25 | 20.5 | 20.5 | 20.0 |
| | 8 | 0.27 | 20.5 | 21.5 | 20.5 |
| | 9 | 0.29 | 20.0 | 21.5 | 21.5 |
| | 10 | 0.33 | 20.0 | 22.0 | 21.5 |
| Comp. product | 11 | 0.22 | 20.7 | 15.8 | 10.8 |
| | 12 | 0.25 | 20.7 | 16.5 | 12.5 |
| | 13 | 0.45 | 20.0 | 13.5 | 11.4 |
| | NS | 0.55 | 20.3 | 10.3 | 6.3 |
| | MS | 0.61 | 20.4 | 10.8 | 7.8 |

*¹amount of solid matter, i.e., copolymer, based on the weight of the cement

We claim:

1. An admixture for concrete comprising a copolymer prepared by copolymerizing a monomer (a) represented by the following formula (A) with a monomer (b) selected from the group consisting of the compounds represented by the following formula (B) and those represented by the following formula (C):

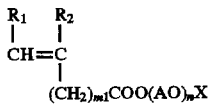  (A)

wherein $R_1$ and $R_2$ may be the same or different from each other and each represents a hydrogen atom or a methyl group; m1 is an integer of 0 to 2; AO represents an oxyalkylene group having 2 to 3 carbon atoms; n is a number of 110 to 300; and X represents a hydrogen atom or an alkyl group having 1 to 3 carbon atoms,

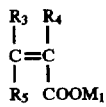  (B)

wherein $R_3$, $R_4$ and $R_5$ may be the same or different from one another and each represents a hydrogen atom, a methyl group or a group represented by the formula: $(CH_2)_{m2}COOM_2$ (wherein m2 is an integer of 0 to 2; and $M_2$ represents a hydrogen atom, an alkali metal atom, ½ an alkaline earth metal atom, an ammonium group, an alkylammonium group or a substituted alkylammonium group); and $M_1$ represents a hydrogen atom, an alkali metal atom, ½ an alkaline earth metal atom, an ammonium group, an alkylammonium group or a substituted alkylammonium group, and

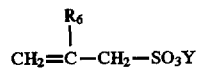  (C)

wherein $R_6$ represents a hydrogen atom or a methyl group; and Y represents a hydrogen atom, an alkali metal atom, ½ an alkaline earth metal atom, an ammonium group, an alkylammonium group or a substituted alkylammonium group and having a molar ratio of monomer (a) to monomer (b) of from 0.1/100 to 100/100.

2. The admixture for concrete as set forth in claim 1, wherein the molar ratio of the monomer (a) to the monomer (b) is from 0.1/100 to 10/100.

3. The admixture for concrete as set forth in claim 1, wherein the molar ratio of the monomer (a) to the monomer (b) is from 10/100 to 100/100.

4. The admixture for concrete as set forth in claim 1, wherein the copolymer has a weight-average molecular weight, which is determined by gel permeation chromatography using sodium polystyrene-sulfonate as a standard reference material, of 3,000 to 1,000,000.

5. A method for improving the fluidity of a hydraulic composition which comprises adding a copolymer prepared by copolymerizing a monomer (a) represented by the following formula (A) with a monomer (b) selected from the group consisting of the compounds represented by the following formula (B) and those represented by the following formula (C) to a hydraulic composition:

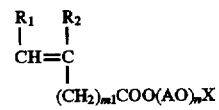  (A)

wherein $R_1$ and $R_2$ may be the same or different from each other and each represents a hydrogen atom or a methyl group; m1 is an integer of 0 to 2; AO represents an oxyalkylene group having 2 to 3 carbon atoms; n is a number of 110 to 300; and X represents a hydrogen atom or an alkyl group having 1 to 3 carbon atoms,

  (B)

wherein $R_3$, $R_4$ and $R_5$ may be the same or different from one another and each represents a hydrogen atom, a methyl group or a group represented by the formula: $(CH_2)_{m2}COOM_2$ (wherein m2 is an integer of 0 to 2; and $M_2$ represents a hydrogen atom, an alkali metal atom, ½ an alkaline earth metal atom, an ammonium group, an alkylammonium group or a substituted alkylammonium group); and $M_1$ represents a hydrogen atom, an alkali metal atom, ½ an alkaline earth metal atom, an ammonium group, an alkylammonium group or a substituted alkylammonium group, and

  (C)

wherein $R_6$ represents a hydrogen atom or a methyl group; and Y represents a hydrogen atom, an alkali metal atom, ½ an alkaline earth metal atom, an ammonium group, an alkylammonium group or a substituted alkylammonium group and having a molar ratio of monomer (a) to monomer (b) of from 0.1/100 to 100/100.

6. A hydraulic composition comprising a copolymer prepared by copolymerizing a monomer (a) represented by the following formula (A) with a monomer (b) selected from the group consisting of the compounds represented by the following formula (B) and those represented by the following formula (C), cement and water:

  (A)

wherein $R_1$ and $R_2$ may be the same or different from each other and each represents a hydrogen atom or a methyl group; m1 is an integer of 0 to 2; AO represents an oxyalkylene group having 2 to 3 carbon atoms; n is a number of 110 to 300; and X represents a hydrogen atom or an alkyl group having 1 to 3 carbon atoms,

  (B)

wherein $R_3$, $R_4$ and $R_5$ may be the same or different from one another and each represents a hydrogen atom, a methyl group or a group represented by the formula: $(CH_2)_{m2}COOM_2$ (wherein m2 is an integer of 0 to 2; and $M_2$ represents a hydrogen atom, an alkali metal atom, ½ an alkaline earth metal atom, an ammonium group, an alkylammonium group or a substituted alkylammonium group); and $M_1$ represents a hydrogen atom, an alkali metal atom, ½ an alkaline earth metal atom, an ammonium group, an alkylammonium group or a substituted alkylammonium group, and

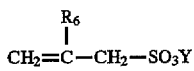 (C)

wherein $R_6$ represents a hydrogen atom or a methyl group; and Y represents a hydrogen atom, an alkali metal atom, ½ an alkaline earth metal atom, an ammonium group, an alkylammonium group or a substituted alkylammonium group and having a molar ratio of monomer (a) to monomer (b) of from 0.1/100 to 100/100.

7. The hydraulic composition as set forth in claim 6, which further comprises an aggregate.

8. The hydraulic composition as set forth in claim 6, wherein the copolymer is present in an amount of 0.02 to 1.0% by weight based on the weight of the cement.

* * * * *